(12) United States Patent
Deghuee

(10) Patent No.: US 6,450,112 B1
(45) Date of Patent: Sep. 17, 2002

(54) VESSEL CONTROL FORCE ALLOCATION OPTIMIZATION

(75) Inventor: Bradley J. Deghuee, Carlsbad, CA (US)

(73) Assignee: Nautronix, Inc., Poway, CA (US)

( * ) Notice: Subject to any disclaimer, the term of this patent is extended or adjusted under 35 U.S.C. 154(b) by 0 days.

(21) Appl. No.: 09/285,549

(22) Filed: Apr. 2, 1999

(51) Int. Cl.$^7$ .............................................. B63H 25/00
(52) U.S. Cl. .......................... 114/144 R; 114/144 A; 114/144 RE; 700/28; 701/21
(58) Field of Search ..................... 114/330, 144 R, 114/144 RE, 144 A, 331, 312, 337; 244/76 R, 3.1, 3.22, 3.15; 701/21; 706/905, 23, 913; 700/28

(56) References Cited

U.S. PATENT DOCUMENTS

| | | | |
|---|---|---|---|
| 3,814,910 A | * 6/1974 | Palmieri et al. | 235/150.2 |
| 4,071,898 A | * 1/1978 | Schorsch et al. | 364/551 |
| 4,074,648 A | * 2/1978 | Reid et al. | 114/144 R |
| 4,089,287 A | 5/1978 | Kranert et al. | 114/144 B |
| 4,340,936 A | * 7/1982 | Mounce | 364/443 |
| 4,384,690 A | * 5/1983 | Brodersen | 244/3.22 |
| 4,532,877 A | 8/1985 | Nagata et al. | 114/144 E |
| 4,799,163 A | * 1/1989 | Wesner | 364/457 |
| 4,884,205 A | * 11/1989 | Hernandez-Diaz | 364/431.01 |
| 5,053,969 A | * 10/1991 | Booth | 364/433 |
| 5,107,424 A | * 4/1992 | Bird et al. | 364/424.01 |
| 5,319,556 A | * 6/1994 | Bessacini | 364/424.01 |
| 5,457,634 A | * 10/1995 | Chakravarty | 364/444 |
| 5,523,951 A | * 6/1996 | Kriesgman et al. | 364/444 |
| 5,601,256 A | * 2/1997 | Harris | 244/52 |
| 5,895,435 A | * 4/1999 | Ohta et al. | 701/59 |
| 5,961,558 A | * 10/1999 | Kvamsdal | 701/21 |
| 5,983,145 A | * 11/1999 | Becker | 701/21 |
| 6,016,763 A | * 1/2000 | Takahashi et al. | 114/331 |
| 6,032,087 A | * 2/2000 | Yamamoto | 701/21 |
| 6,052,630 A | * 4/2000 | Holmes et al. | 701/13 |
| 6,070,833 A | * 6/2000 | Burke et al. | 244/168 |
| 6,206,324 B1 | * 3/2001 | Smith | 244/72 |

FOREIGN PATENT DOCUMENTS

| | | | | |
|---|---|---|---|---|
| JP | 59-102695 | * | 6/1984 | 114/144 E |
| JP | 61-247592 | * | 11/1986 | 114/144 E |
| JP | 62-160994 | * | 7/1987 | 114/144 E |
| JP | 62-295793 | * | 12/1987 | 114/144 E |
| JP | 1-148696 | * | 6/1989 | 114/144 E |
| JP | 2-106492 | * | 4/1990 | 114/144 E |
| JP | 2-200597 | * | 8/1990 | 114/144 E |
| JP | 3-32995 | * | 2/1991 | 114/144 A |
| SU | 1625780 | * | 2/1991 | 114/144 E |

* cited by examiner

*Primary Examiner*—S. Joseph Morano
*Assistant Examiner*—Ajay Vasudeva
(74) *Attorney, Agent, or Firm*—Don E. Erickson

(57) ABSTRACT

A method for the automatic positioning of a vessel, the method including a command source for inputting a desired vessel position or rate to control laws, the control laws for determining a force or moment required for achieving the desired position or rate, an external forces determinant for determining disturbing forces and moments acting on the vessel, a feed forward mechanism for combining the force or moment from the control laws and the disturbing forces and moments, to produce a resultant force and a resultant moment for processing by thrust allocation logic, the thrust allocation logic for determining the allocation of a force and a moment to be generated by propulsion effectors, the propulsion effectors for positioning the vessel, and wherein the thrust allocation logic includess the application of numerical optimization techniques to force and moment allocation.

15 Claims, 3 Drawing Sheets

VESSEL CONTROL FORCE ALLOCATION OPTIMIZATION

FIELD OF THE INVENTION

The present invention relates to a method for the automatic positioning of a vessel, by which the vessel can be moved, by propulsion means, in the direction opposite of the main external disturbance, or position deviation, forces. And more particularly, the present invention relates to an improved thruster allocation logic for automatic positioning of the vessel, and specifically, to applying numerical optimization methods to the problem of force and moment allocation in vessel position and rate control.

BACKGROUND OF THE INVENTION

In order to perform the dynamic positioning of the vessel there must be provided propulsion means, which act to hold the vessel accurately at a working position. Proper commands to the propulsion means must be determined with a combination of control laws and thruster allocation logic. Examples of the types of vessels involved are aircraft, spacecraft, submarines, surface ships, and other such vessels. The propulsion means include jet propulsion, rocket propulsion, propellers, adjustable propellers, screws and rudders. It is also possible to combine transverse thrust systems with active propellers.

When a vessel is being dynamically positioned, the vessel is frequently placed with its bow facing in the direction of the resultant of the disturbance forces since in this position it will have the lowest wind, water and/or wave resistance, i.e. the external influences will apply the lowest force levels to the vessel. Another method for setting the required vessel heading is described in U.S. Pat. No. 4,089,287 to Kranert, et al., which discloses an automatic method and apparatus for setting the required vessel heading to minimize the influence of external disturbance forces. Position or rate control of such vessels as aircraft, surface ships, underwater vehicles and rockets has been achieved using a variety of control laws including Proportional/Integral/Derivative, H-infinity, and nonlinear sliding mode controls. All control laws have common inputs and outputs. FIG. 1 illustrates the basic components and relationships involved in current state of the art vessel position control. Desired Position Command Source 101, generates the required vessel positions. The required position inputs can come from an operator, an automatic path planner, or other external sources. Inputs to the Control Laws Logic 102 include required position or rate for the degrees of freedom to be controlled. The other required input to the control laws is feedback on the state of the vessel from Position/Rate Measurement 108, such as Differential Global Positioning Systems, hydro-acoustic positioning systems, and Kalman filters.

Outputs of the Control Law 102 logic are the force or moment in the controlled degree of freedom required achieving the desired position or rate. These forces and moments are usually generated without regard to the vessel's capability to generate them. Output of External Forces Detector 103, for determining disturbing forces and moments, may supplement the required control forces and moments in a Feed Forward 104. Examples of disturbing forces include, but are not limited to wind, wave, current, gravity and manual thruster commands, and may be detected with a variety of sensors and operator inputs. The Feed Forward 104 may be simply accomplished by addition of forces and moments that compensate for the disturbing forces and moments to the required Control Laws 102 forces and moments via electrical circuit or numerically in a computer. These disturbing forces are detected by sensors and/or inputted to the computer by an operator. The combination of Control Law 102, External Forces 103, and Feed Forward 104 comprise force setting means and moment setting means. The total required forces and moments are then allocated to the available effectors in Thrust Allocation Logic 105 before commands pass to the Force Generating Effectors 106, which generate forces and turning moments that act on Vessel 107.

Until now, the allocation of the forces and moments required to control vessel position to the available vessel Force Generating Effector 106, such as thrusters and rudders, has been synthesized with complicated, highly structured logic. Each new configuration of effectors has required customization of computer software to calculate the best set of commands to the effectors that achieve the required forces and moments on the vessel while observing constraints on the effectors and power availability. Often, there is an infinite number of possible effector command sets that can achieve the required net forces and moments on the vessel. Conventional Thrust Allocation Logic methods do not always select the optimal solution. In some cases, no command set is found that achieves the required forces and moments and the vessel position control is compromised. This may be due to physical limitations of the available effectors or due to failure of the Thrust Allocation Logic to find an existing feasible set.

The set of required forces and moments determined by the Control Laws Logic 102 and Feed Forward 104 can usually be achieved in more than one way. Consider a relatively simple system of a surface ship with two main longitudinal propellers each with its own rudder. There are four independent commands to be determined, one for each effector. Suppose that only three degrees of freedom are to be controlled: fore/aft, port/starboard, and heading. The sum of forces from the two main props must equal the required fore/aft force (ignoring drag forces on the rudders). Rudders acting in the flow of the main propellers must provide the required port/starboard force. The moment required to control heading must be met by the differential forces of the main propellers acting across their lateral (port/starboard) separation plus the moment due to the rudders and their longitudinal (fore/aft) separation from the vessel center of rotation. The four unknowns (commands) are therefore under-specified by the three governing equations.

In some vessel configurations, a fourth equation can be specified, such as a requirement to minimize thruster power, and the four equations are solved simultaneously to determine the necessary effector commands. This is satisfactory only if the fourth equation is the appropriate one for the application and the resulting set of equations can be solved, but that is often not the case. In general, the goals for the allocation of control forces do not lend themselves to simple mathematical solution.

In addition to meeting the required set of control forces, there are frequently other allocation goals to be achieved. These goals include: minimum change from current set of commands; minimum power usage; minimize the maximum effector command; minimize the sum of the squares of the effector commands; minimize the difference between the minimum and the maximum effector commands; and establish preferences for use of one set of effectors over another set.

If the required set of control forces can not be achieved, then it may be desirable to come as close as possible to such control forces, sacrificing control in some degrees of freedom in favor of others. While maximizing performance goals, or minimizing penalties, there may be allocation constraints on the solution. They can be equality constraints or inequality constraints, and they can be linear or nonlinear in the control variables. The most obvious constraints are simple bounds on the allowable commands. Other constraints on an individual effector might include: minimum levels, due to clutching, stiction, or other mechanism; unallowable command regions, such as thruster wash angles spoiling hydrophone sensors or other thrusters, critical shaft speed avoidance, etc.; and minimum thruster level to reduce azimuth control chattering.

Other constraints affect multiple effectors simultaneously, such as maximum total power levels and minimum total power levels required, for example, to meet minimum generator power loading. The requirement to meet the required control forces may also be considered a constraint on the solution set.

Typical of the state of the art in force and moment allocations for disturbing forces for vessels is U.S. Pat. No. 4,532,877 to Nagata, et al., entitled, "Maneuvering System of Watercraft and the Like." Nagata, et al. solves a set of simultaneous equations defining the calculation of net forces and moments in surge, augmented by a requirement to minimize the sum of squares of the individual thrusters' surge and sway force components. Nagata, et al. then describes a method of selecting the minimum reduction of forces required to bring all the thruster commands within their thrust capabilities. All thruster commands are then reduced by this single percentage. The method described by Nagata, et. al. does result in thruster commands that fall within the constraints of thruster capabilities. It does so while maintaining the same ratios of surge, sway, and yaw. In most marine related applications, however, achieving the required yaw moment is given highest priority at the expense of surge and sway forces. Vessel heading is normally oriented into the weather along the vessel's most streamlined direction so that required control forces are minimized. If the vessel is unable to achieve required control forces in all three degrees of freedom, yaw moment should receive the highest priority since failure in that degree of freedom causes the vessel to rotate perpendicular to the weather making it even more difficult to recover. The method described by Nagata et. al. also fails to achieve the required net thrust force and moment results if any thruster command initially exceeds its rated capability even when some other combination of thruster commands could achieve the required set of forces and moment.

One common method of thrust allocation logic is often referred to as the Pin Wheel Moment allocation because of the pin wheel shape generated in vector diagrams of the resulting effector command. The simultaneous equations are solved with the added constraints that each effector will use the same fraction of rated control force in a given degree of freedom. For example, each thruster might use 25% of its rated surge force capability to meet the total required surge force, 30% of its rated sway force capability to meet the total required sway force, and 45% of its rated moment generating capability to achieve the required yaw moment.

Other methods in use or considered include: assignment of effectors to single degrees of freedom; allocation to meet surge, then sway, then yaw with each allocation adding to the previous one; and table lookup. However, each of these methods has inadequacies which result in the deficiencies noted above.

SUMMARY OF THE INVENTION

In the automatic positioning system of the preferred embodiments of the present invention, the Contol Law 102, Feed Forward 104 and Thrust Allocation Logic 105 functions are accomplished in a computer, while the Command Source 101, External Forces 103, Effectors 106, and Feedback Measure 108 are accomplished utilizing manual input, sensors, and electrical and mechanical devices. It is an object of the present invention to provide an improved and new method for positioning a vessel, as described in FIG. 1, using numerical optimization techniques heretofore not used in Thrust Allocation Logic 105, which optimization techniques satisfy all of the constraints on the effector command solution and maximize given performance measurements. This, and other objects, are accomplished according to the present invention by applying numerical optimization methods to the problem of force and moment allocation in vessel position and rate control. Numerical optimization methods have, heretofore, never been applied to Thrust Allocation Logic 105 in vessel control. Numerical optimization methods improve the allocation of effector commands in terms appropriate to the application, often finding solutions not found by current methods, and simplifies the design of new allocation systems. Although the present invention applies to all of the types of vessels as described above, the invention will be described as it relates to a surface ship.

Optimization, in general, is the process of finding a set of independent values that minimize or maximize a set of dependent values in a function. When the dependent values are linearly related to the independent values, linear programming techniques can be applied. In the more general case of nonlinear functions, search techniques are applied depending on the form of the function, the constraints on the independent values, solution time limits, and accuracy requirements. An example of an algorithm applicable to the constrained, nonlinear functions typical of many vessel force and moment allocation problems is sequential quadratic programming. The processing times and memory capabilities of existing computer systems make the trial and error searches of numerical optimization techniques feasible in real time settings.

DETAILED DESCRIPTION

The application of the numerical optimization methods of the invention involves the definition of allocation performance measures, the identification of constraints and bounds, and the application of the selected search method.

The allocation performance measures are the goal (or penalty) function that is to be maximized (or minimized). A goal-type performance measure might be to maximize use of thruster A compared to thruster B. The equivalent penalty performance measure would be to minimize use of thruster B compared to thruster A. These are not "go-no go" criteria, but are the important distinguishing factors between what is considered a good answer versus a bad answer.

EXEMPLARY EMBODIMENTS

Figure 1:
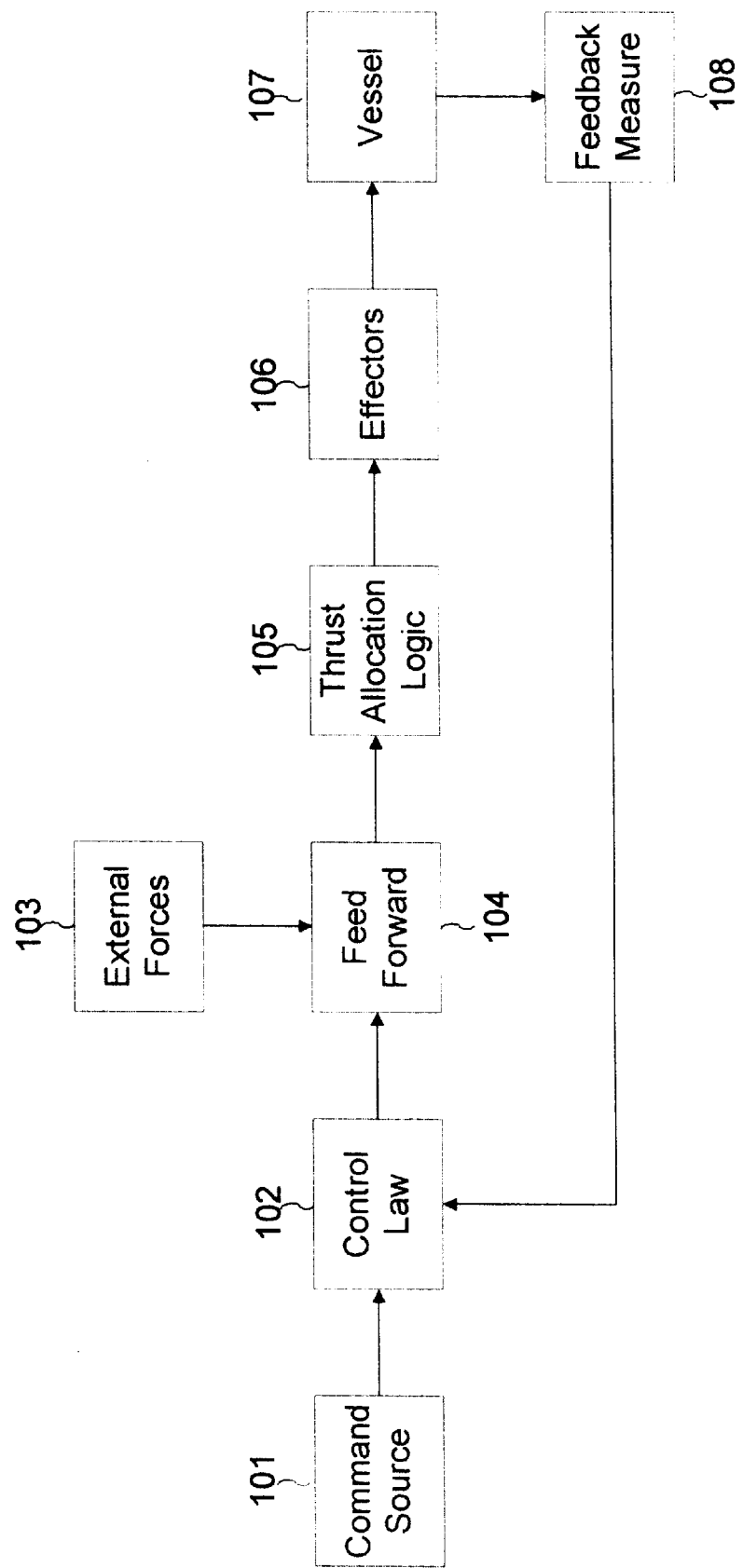
FIG. 1 shows the relationship of force and moment allocation to the overall vessel position control problem.
Figure 2:
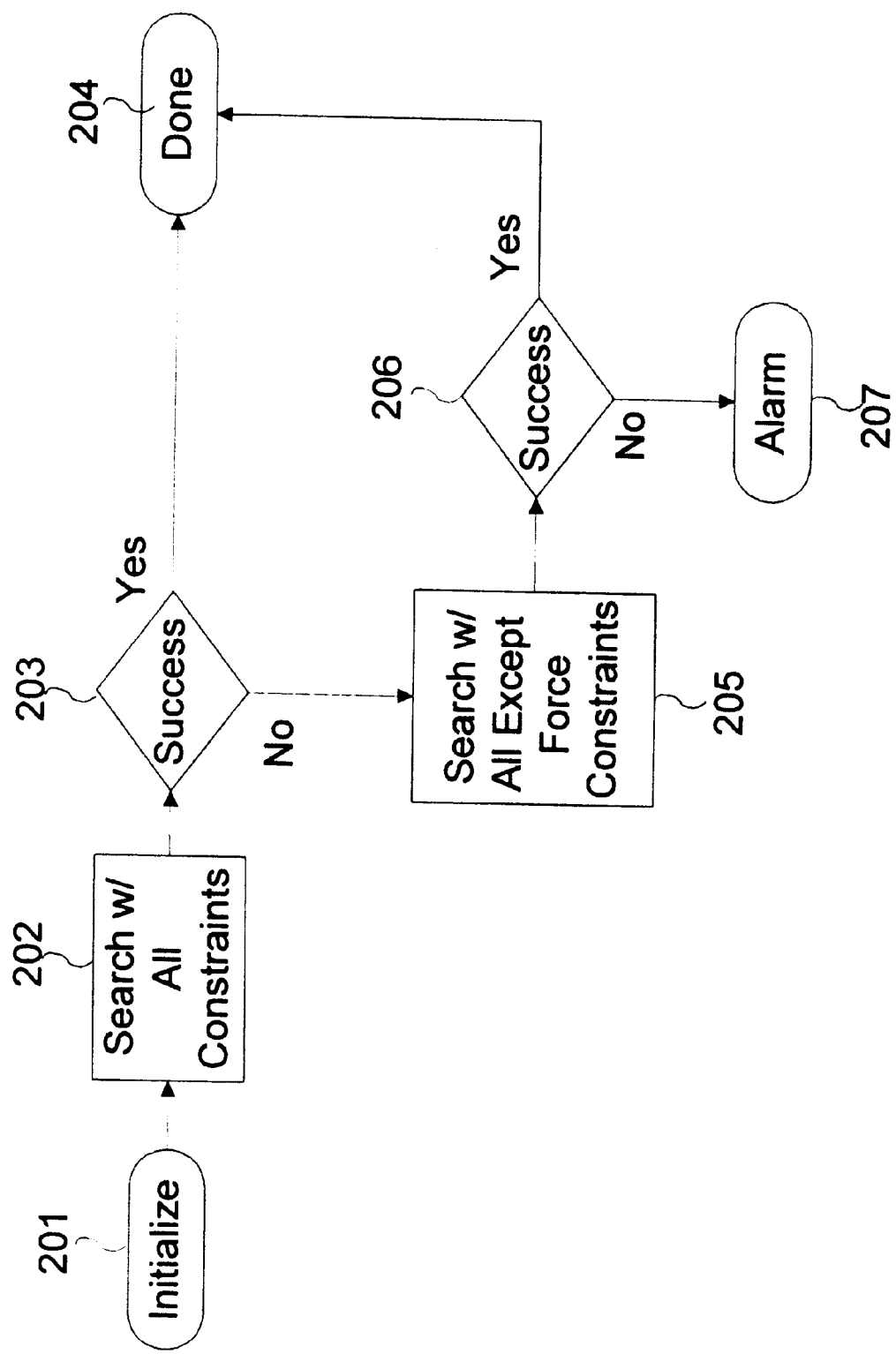
FIG. 2 is a logic flow chart of a first exemplary embodiment of optimization strategy for thrust allocation.

FIG. 2 diagrams the first exemplary embodiment of the thrust allocation logic of the invention. Each control cycle includes a complete search incorporating the current set of performance measures and constraints. Each search begins from a guess at the solution set of commands. The logical starting point for many situations is simply starting at the solution found during the previous control cycle and search. Since the required control forces and moments usually do not change significantly in a single control cycle, it is likely that the optimum solution is near the previous solution. In addition, it is often desirable that the effector commands do not exhibit large fluctuations from cycle to cycle, so the performance measure may include a component that drives the optimization close to the previous solution, even if the search did not start there.

In 201, all the constraints are enabled, including the constraints to meet the required control forces and moments. The performance measures related to getting as close as possible to the required control forces and moments are not required here since they are already constrained to meet them exactly. Depending on the requirements of the chosen optimization method, the components of the performance measure may be specified individually or they may be combined into a single composite performance measure, perhaps by using a sum of weighted components technique. The weights would then define the relative importance of the individual components. Some possible performance measure components are discussed below.

Possible power level related goals include: power minimization, loading of one power bus in preference to another, and minimization of power level changes.

Large command rates of changes from control cycle to control cycle can increase wear and tear on effectors. It can also result in time delays between the command and the time when the desired effector force is achieved. These delays in the control loop can result in instability. It is therefore frequently a goal of the allocation function to minimize the rate of change of commands.

It may be desirable to simply reduce the maximum effector command level. Alternatively, it may be desirable to reduce the difference between the maximum command and the minimum command level. The resulting allocation will then tend to use all effectors at close to the same level, all reaching saturation at the same point. Another way to reduce overall thruster commands is to minimize the average command level. There may be command ranges that are not completely disallowed, but they should be avoided, if possible. Examples include thruster azimuth angles that cause wash to disrupt sensors, other thrusters or vessels alongside. Another example is a critical shaft speed for a propeller.

Allocation constraints and bounds apply hard limits to the set of possible effector commands. The bounds are simple maximum/minimum limits on the value of the command. More complex constraints may apply to the individual commands, individual effectors (with multiple commands), power busses, multiple effectors, or other groups. Some of the possible constraints are discussed below. Constraints on the forces and moments resulting from the command set are used to drive the command set to one that meets the required control forces and moments. Some constraints apply to an individual effector command or to a set of commands that affect a single effector. Examples include:

1. Level—When a single command determines the force level of an effector, the limit on its level can be a simple bound. Other multi-command effectors may require more complicated constraints to limit level.
2. Avoidance Zones—An example where an avoidance zone constraint may be required is a ship thruster capable of azimuthing its line of force to various angles. At certain angular zones, the thruster wash may spoil the operation of ship's hydrophone sensors or the efficiency of adjacent thrusters. In these, cases, the azimuthing thruster can be constrained to operate outside the avoidance zones.
3. Clutching—Effectors are often unable to deliver low levels of force due to clutch requirements, stiction, or other limitations. In these cases, a command set including a low-level command for the effector is unacceptable.
4. Manual—Some effectors may be taken offline or be set to fixed commands. This becomes a constraint on the solution.

Effectors are frequently grouped onto one or more power busses to which power constraints apply such as:

1. Maximum Power Level—power drawn from the power bus by the effectors must be kept at or below that available from the bus.
2. Minimum Power Level—for efficient operation of generators on a power bus, a minimum power draw is required.
3. Power Rate of Change—the rate of change of power drawn from a bus may be limited.

Optimizations, in simplest form, are simply trial and error searches for a solution set that conform to the constraints and maximize the performance measure in some local or global sense. A variety of existing optimization methods may be applied, such as steepest descent, simplex search, Newton's method, quasi-Newton methods, least squares, Gauss-Newton, and Sequential Quadratic Programming.

Process 202 is the actual search for an optimum solution. This process generally involves multiple evaluations of the constraints and performance measures at various trial effector command sets. In 203, criteria for a successful search are evaluated. If the search was successful, then the search is done, and the thrust allocation is complete and the commands are passed to the effector interface, 205. If the search in 202 was not successful, then a search with continuous restraints, but without force constraints, is performed in 205. The purpose is to get as close as possible to the optimum results. When the complete set of required forces and moments can not be met, the differences between the achieved and required forces and moments are minimized. Each degree of freedom can have a different weighting factor so that minimizing the discrepancy in one degree of freedom can have priority over other degrees of freedom. For example, yaw is usually selected to have highest priority so that the heading requiring minimum thrust is maintained. In some cases, it may be desirable to give surge force a higher priority than sway force, since higher inertia and drag in the sway direction may reduce the transient effect of not achieving the required control force. On the other hand, a small position offset in sway requires more force to correct so that surge and sway are weighted equally. The search results are evaluated in 206, and if the search was successful, meaning the search produced results meeting the reduced criterion, the thrust allocation is complete and the commands are passed to the effector interface, 205.

It is also possible for the search to fail to find any set of commands that will result in the required forces and moments. For example, the required forces and moments may exceed the physical capabilities of the effectors. It is then necessary to exclude the constraints holding the solution to the required forces and moments and add performance measure components with appropriate weighting factors driving the solution as close as possible to the required forces and moments. For example, consider a surface ship holding position and heading. If the forces and moments specified by the control algorithm can not be achieved, a compromise solution would be chosen that prioritized heading control at the expense of position control. If the search was not successful, then an alarm 207 is sent to the operator.

Some constraints divide the possible solution space into separate regions. These constraints are called discontinuous. Examples of discontinuous constraints include clutching and avoidance zones. Separated solution regions provide a dilemma for some optimization techniques. When the solution approaches the edge of the region, the command set can get frozen at the edge, failing to "jump" to adjacent regions which may contain more optimal solutions. Another example of discontinuous constraints is due to angular ambiguity. Consider an azimuthing thruster, capable of accepting a thrust level command and an angular command. A search algorithm may not recognized that a 359 degree command is close to a 1 degree command and fail to locate the appropriate optimum command set. This problem can be avoided by searching for the effective fore/aft and port/starboard commands instead of the thrust level and angle. The bound on thrust level is maintained by employing an inequality constraint on the sum of the squares of the fore/aft and port/starboard effective thrusts. One technique that has proven effective in these cases is a double pass through the solution. In the first pass, all discontinuous constraints are disabled. The search then finds the optimal solution regardless of the discontinuous constraints. The solution can then be tested against the discontinuous constraints. If the solution does not violate the discontinuous constraints, the search is complete. If the solution does violate one or more discontinuous constraints, a final solution is found nearest the first pass solution that does not violate the constraints.

Figure 3:
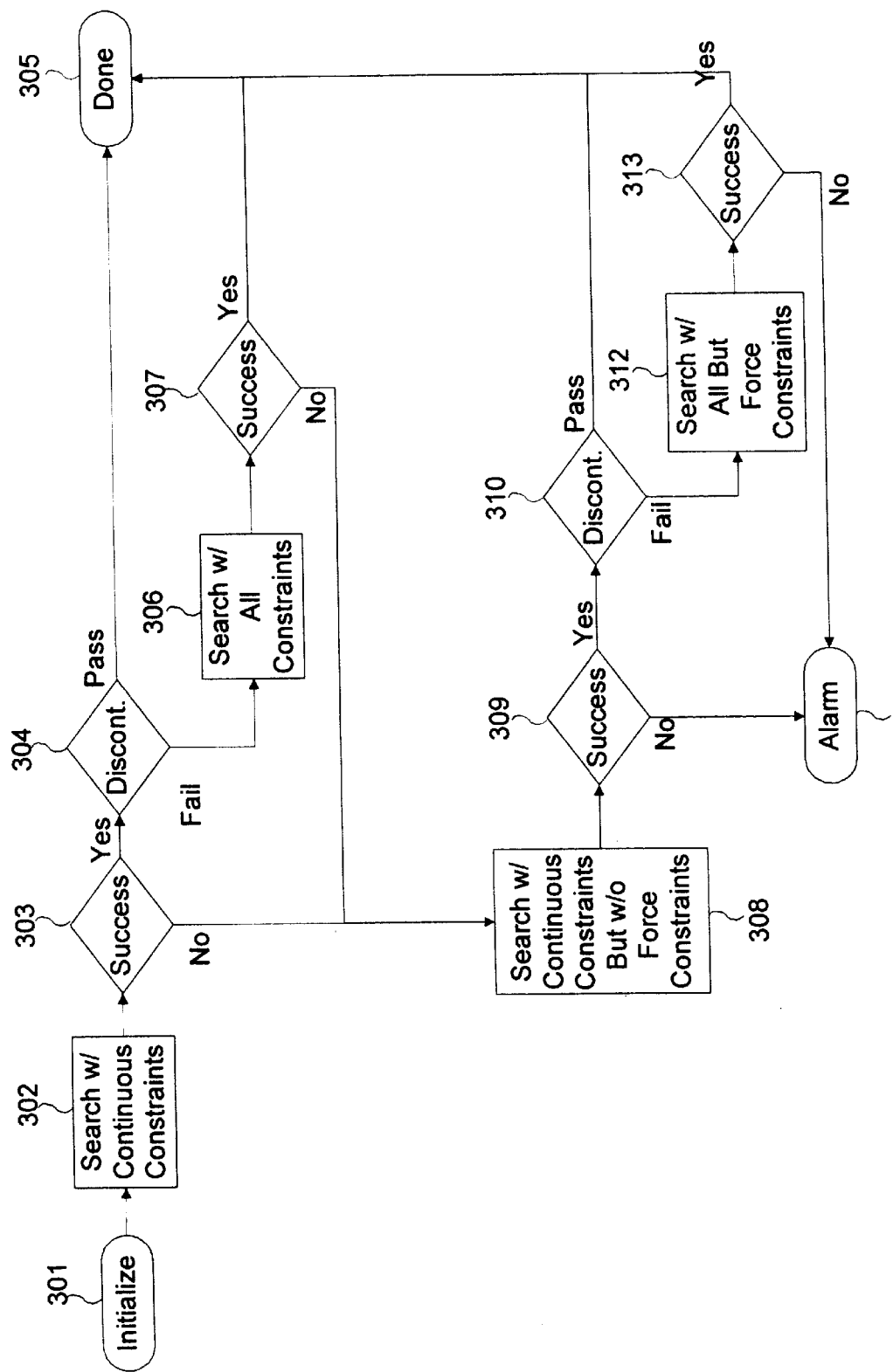
FIG. 3 is a logic flow chart of a second exemplary embodiment of optimization strategy for thrust allocation.

In the first embodiment, the difference between continuous and discontinuous constraints is ignored. FIG. 3 diagrams a second, more complex, exemplary embodiment of the invention in which discontinuities are tested. As in the first exemplary embodiment, each control cycle includes a complete search incorporating the current set of performance measures and constraints. In 301, the continuous constraints are enabled, including the constraints to meet the required control forces and moments. As in the first exemplary embodiment, the performance measures relating to getting as close as possible to the required control forces and moments are not required here.

Process 302 is the actual search for an optimum solution based on continuous constraints only. This process generally involves multiple evaluations of the constraints and performance measures at various trial effector command sets. In 303, criteria for a successful search are evaluated. If the search is successful, an evaluation of the discontinuous constraints is performed in 304. If the solution set also satisfies the discontinuous constraints, the thrust allocation is complete and the commands are passed to the effector interface, 305. If the solution does not satisfy the discontinuous constraints in 304, the discontinuous constraints are enabled and another search performed in 306 with continuous and discontinuous constraints and with the initial guess set equal to the command set found in 302. If the new search is successful, as determined in 307, the thrust allocation is complete and the commands are passed to the effector interface, 305. If the search with continuous constraints in 302, or if the search with all constraints in 306, fail to meet the success criteria, the force and moment constraints are disabled, the associated performance measures are enabled, and the discontinuous constraints are disabled (if necessary) in 308, and another search performed. If no acceptable solution is found in 309, an alarm 311 is sent to the operator. If the search was successful in 309, and if the solution meet the discontinuous constraints in 310, the thrust allocation is complete and the commands are passed to the effector interface, 305. If the solution is not acceptable, a search with all constraints enabled except force constraints is performed in 312. If the search was successful, as determined in 313, the thrust allocation is complete and the commands are passed to the effector interface, 305. If the search was not successful, no acceptable commands were found, and an alarm 311 is sent to the operator. The operator or the algorithm may then select a new starting point and initiate the search again.

Most optimization methods do not guarantee global optimization. It is therefore possible for the search to end in a local performance measure minimum. This is not often a problem with the method described here due to the well-behaved types of performance measures and constraint selected. For example, the rate of change minimization goals described above tend to make the globally optimum command set close to the starting point, the previous solution set. Another possible approach is to repeat the search from a variety of different starting point, increasing the probability of finding the global optimum.

The numerical optimization methods of the present invention may be utilized for maintaining vessel positioning and heading, as well as other desired vessel control. Accordingly, the scope of the invention should not be determined by the specific embodiments illustrated herein, but rather in light of the full scope of the claims appended hereto. For example, Control Law 102 and Feed Forward 104 can be accomplished using analog electrical circuitry. Alternatively, the Command Source 101, the Control Law 102, and the Feed Forward 104 functions could be performed by a human operator directly inputting required forces and moments into Thrust Allocation Logic 105.

I claim:

1. In a method for automatically positioning a vessel subjected to external disturbance forces and moments, said vessel having propulsion means, the propulsion means having at least two effectors, the propulsion means arranged to orient the vessel in regard to a resultant of such disturbance forces and moments, the improvement comprising: an application of numerical optimization techniques directly to force and moment allocation for all effectors of said propulsion means, wherein said numerical optimization techniques determine a single value for each said effector.

2. The method of claim 1 in which the propulsion means has continuous and discontinuous restraints, and wherein the application of numerical optimization techniques does not distinguish between continuous and discontinuous constraints.

3. The method of claim 1 in which the propulsion means has continuous and discontinuous restraints, and wherein the application of numerical optimization techniques distinguishes between continuous and discontinuous constraints.

4. The method of claim 3 in which the application of numerical optimization techniques first considers continuous constraints, and then considers discontinuous constraints when the result of the first optimization violates the discontinuous constraints.

5. The method of claim 1 wherein the propulsion means are selected from the group of jet propulsion, rocket propulsion, propellers, adjustable propellers, screws and rudders.

6. A method for automatically positioning a vessel having propulsion means, said method comprising:
   a. force setting means for inputting to a thrust allocation logic a force to be imparted to the vessel;
   b. moment setting means for inputting to the thrust allocation logic a turning moment to be imparted to the vessel;
   c. at least two propulsion effectors for outputting corresponding forces to the vessel;
   d. thrust allocation logic operatively connected to the force setting means and moment setting means, the thrust allocation logic for supplying instructions to the propulsion effectors, said forces being composed of a resultant force and a resultant moment coincident with said set force and set moment; and
   wherein said thrust allocation logic comprises the application of numerical optimization techniques directly to force and moment allocation, for all effectors of said propulsion means, and wherein said numerical optimization techniques determine a single value for each said effector.

7. The method of claim 6 in which the propulsion means has continuous and discontinuous restraints, and wherein the application of numerical optimization techniques does not distinguish between continuous and discontinuous constraints.

8. The method of claim 6 in which the propulsion means has continuous and discontinuous restraints, and wherein the application of numerical optimization techniques distinguishes between continuous and discontinuous constraints.

9. The method of claim 8 in which the application of numerical optimization techniques first considers continuous constraints, and then considers discontinuous constraints when the result of the first optimization violates the discontinuous constraints.

10. The method of claim 6 wherein the propulsion means are selected from the group of jet propulsion, rocket propulsion, propellers, adjustable propellers, screws and rudders.

11. A method for the automatic positioning of a vessel, the method comprising:
   a. a command source for inputting a desired vessel position or rate to control laws;
   b. the control laws for determining a force or moment required for achieving the desired position or rate;
   c. an external forces determinant for determining disturbing forces and moments acting on the vessel;
   d. a feed forward mechanism for combining the force or moment from the control laws and the disturbing forces and moments, to produce a resultant force and a resultant moment for processing by thrust allocation logic;
   e. the thrust allocation logic for determining the allocation of a force and a moment to be generated by propulsion effectors;
   f. the propulsion effectors for positioning the vessel; and
   wherein the thrust allocation logic comprises the application of numerical optimization techniques to force and moment allocation.

12. The method of claim 11 in which the propulsion means has continuous and discontinuous restraints, and wherein the application of numerical optimization techniques does not distinguish between continuous and discontinuous constraints.

13. The method of claim 11 in which the propulsion means has continuous and discontinuous restraints, and wherein the application of numerical optimization techniques distinguishes between continuous and discontinuous constraints.

14. The method of claim 13 in which the application of numerical optimization techniques first considers continuous constraints, and then considers discontinuous constraints when the result of the first optimization violates the discontinuous constraints.

15. The method of claim 11 wherein the propulsion means are selected from the group of jet propulsion, rocket propulsion, propellers, adjustable propellers, screws and rudders.

* * * * *